United States Patent

[11] 3,590,458

| [72] | Inventor | Clifford H. Day<br>Box 602, McLean, Tex. 79057 |
|---|---|---|
| [21] | Appl. No. | 828,833 |
| [22] | Filed | May 29, 1969 |
| [45] | Patented | July 6, 1971<br>Continuation-in-part of application Ser. No. 635,114, , now abandoned. |

[54] FOUR-CORNER PICTURE FRAME ASSEMBLY UNIT
20 Claims, 7 Drawing Figs.

[52] U.S. Cl. ..................................................... 29/200, 269/41, 269/112
[51] Int. Cl. ....................................................... B23p 19/00
[50] Field of Search ........................................... 29/200 P, 208 F, 476; 269/41, 104, 112

[56] References Cited
UNITED STATES PATENTS

| 149,425 | 4/1874 | Banks et al. ................. | 269/109 |
| 1,612,299 | 12/1926 | Madsen ....................... | 269/112 X |
| 2,783,531 | 3/1957 | Eisler .......................... | 269/71 X |
| 2,908,300 | 10/1959 | Hahn ........................... | 269/41 X |
| 3,460,226 | 8/1969 | Hildebrand .................. | 29/200 |

*Primary Examiner*—Thomas H. Eager
*Attorney*—Jacobi, Davidson & Kleeman

ABSTRACT: A four-corner picture frame assembly unit comprising a workbench rotatably mounted on a base or support. The workbench supports an arm mounting means from which extend four pivotally mounted outwardly extending arms or bars. Freely slidable on each of these arms or bars is a rider or runner that pivotally carries a conventional corner clamp. Each corner clamp has two fixed flange members extending therefrom at right angles to each other and a screw actuated clamping means associated with each flange. The screw actuated clamping means are arranged to temporarily secure sections or lengths of molding in place against the flange members and in abutting relationship until they are permanently held together by conventional means, such as, nails, screws and/or glue.

PATENTED JUL 6 1971

INVENTOR,
CLIFFORD H. DAY
BY Jacobi & Davidson
ATTORNEYS

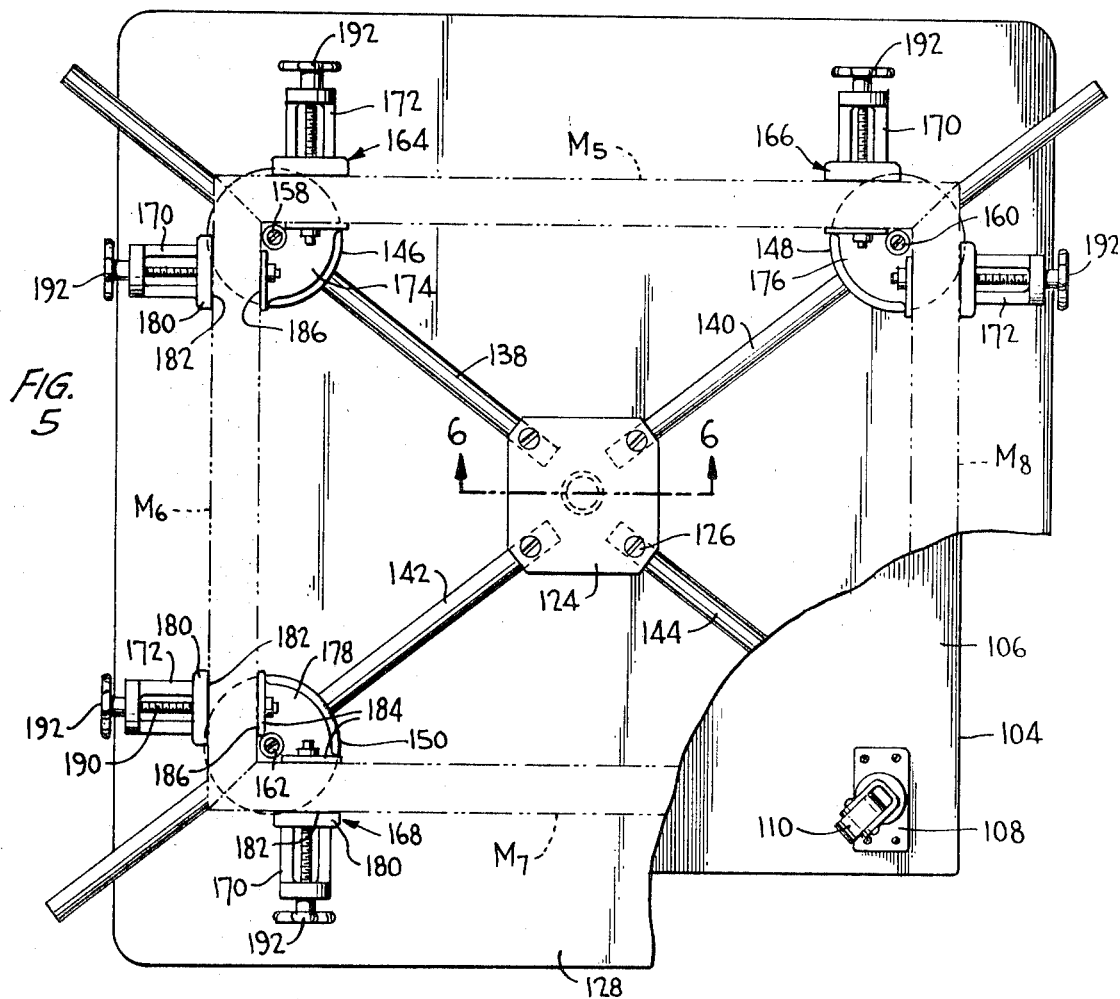
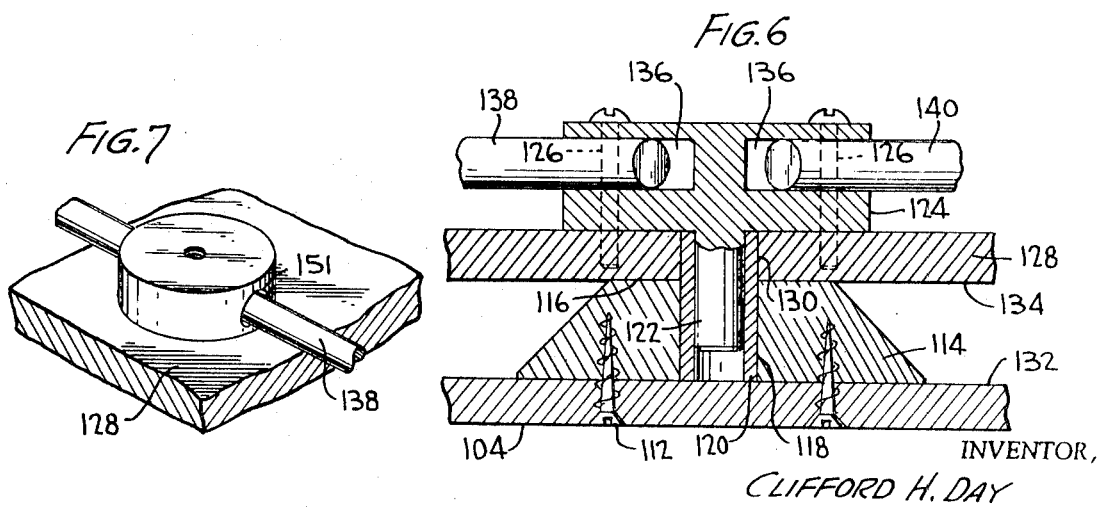

3,590,458

FOUR-CORNER PICTURE FRAME ASSEMBLY UNIT

The present invention constitutes a continuation-in-part of my copending application Ser. No. 635,114 entitled "Four Corner Picture Frame Assembly Unit," now abandoned.

BACKGROUND OF THE INVENTION

The present invention relates to assembly mechanisms and more particularly to an assembly mechanism that is suitable for temporarily holding together, for example, four sections of frame molding in the shape of a frame particularly useful in the mounting of pictures, but also serving as a frame for mounting mirrors and the like until such sections can be permanently secured together by conventional fastening devices, glue or both.

While assembly units for making frames are not unknown, such devices that are available commercially have been impractical since they were either too bulky, too costly, too complicated structurally, or so poorly constructed that they were incapable of producing properly aligned frames after repeated use.

Taking into consideration the foregoing deficiencies, it is the primary object of the present invention to produce a frame assembly unit that is capable, for long periods of time and after many operations thereof, of still accurately positioning and effectively holding in position the abutting mitered ends of frame sections until they can be permanently secured together thereby making it possible to obtain frames having perfect corners.

Another object of the invention is to provide a picture frame assembly unit which is capable of being adjusted to produce a picture frame of any desired length.

Yet, another object of the invention is to provide a picture frame assembly unit which is capable of being adjusted to provide picture frames of any desired width.

Still another object of the invention is to provide a picture frame assembly unit that is mounted upon a rotatable workbench so that the frame, the sections of which are temporarily held together by clamps, may be turned in such a manner that a workman may perform, at one corner after another, whatever operations thereon may be necessary to secure the sections forming the corner together without moving from a predetermined position.

A further object of the invention is to provide a picture frame assembly unit having pivotally mounted outwardly radiating arms or bars on which are, respectively, mounted freely movable runners or riders that pivotally carry corner clamping devices by means of which the ends of molding sections that form frame corners are temporarily but securely held in abutting relationship until they can be permanently secured together.

A still further object of the invention is to provide a picture frame assembly unit according to the present teachings which is simple in construction, easy to operate, durable and made of materials of relatively low cost.

The invention will be better understood and objects other than those set forth above will become apparent after reading the following detailed description thereof. Such description refers to the annexed drawings presenting preferred and illustrative embodiments of the invention.

In the drawings

FIG. 5 is a plan view of a modified form of picture frame assembly unit according to the present invention showing a portion of the rotatable workbench cut away;

FIG. 6 is a sectional view taken on the section line 6—6 of FIG. 5; and

FIG. 7 is a perspective view showing a round block used as a runner for pivotally mounting a corner clamping vice on a bar or arm of the frame assembly unit.

DESCRIPTION OF THE PREFERRED EMBODIMENT

Figure 1:
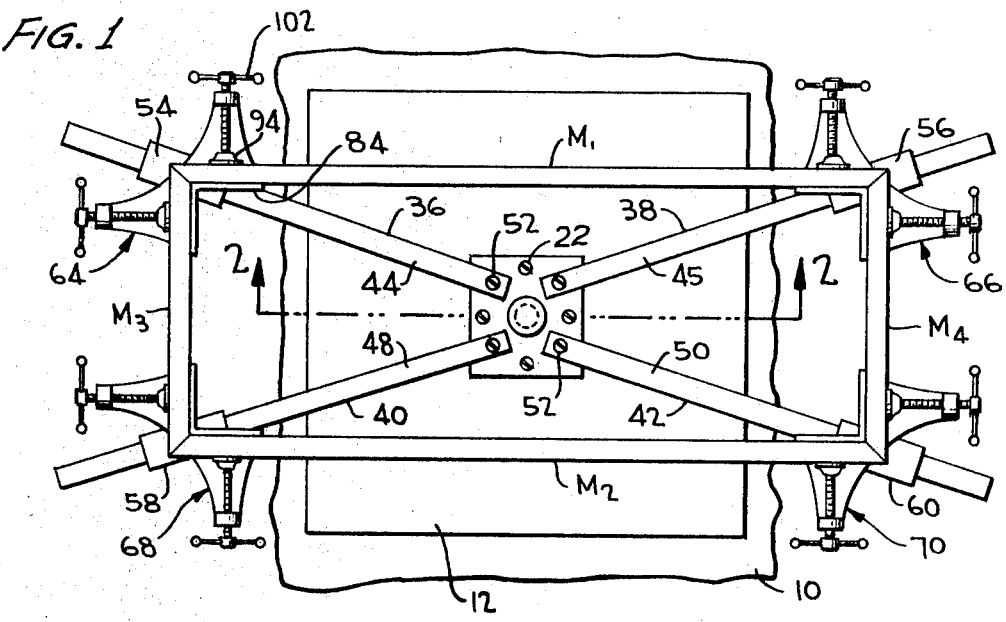
FIG. 1 is a plan view of a picture frame assembly unit according to the present invention.
Figure 2:
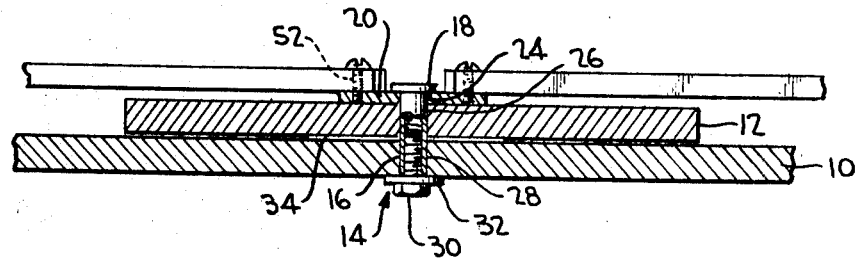
FIG. 2 is a sectional view taken on the line 2—2 of FIG. 1.

Referring to the drawings, it is to be noted that the device disclosed in FIGS. 1 to 4 includes a support of any conventional construction, indicated generally by the numeral 10. A workbench 12 of any suitable material, such as plywood, and of any desired configuration, and shown for convenience as square, is arranged to be rotatably secured to the support 10 by a bolt and sleeve construction indicated, generally, by the numeral 14.

The bolt and sleeve construction 14 includes an internally threaded sleeve 16 that has a flat head 18 that rests on the upper surface of an arm mounting plate 20 which is approximately 5 inches × 5 inches and formed of any suitable material, such as, metal or masonite, and is secured by bolts 22 to the workbench 12. The sleeve 16 has a smooth exterior and extends through aligned openings 24 in arm mounting plate 20, 26 in workbench 12 and 28 in support 10.

A threaded bolt 30 carrying a flat washer 32 is threaded into the threaded sleeve 16 until flat head 18 of sleeve 16 firmly engages arm mounting plate 20 and washer 32 firmly engages support 10. It is to be understood that bolt 30 is tightened sufficiently to effect the mounting of workbench 12 on support 10, but not tightened to such an extent that it would preclude rotation of workbench 12 relative to support 10.

Four bars or arms 36, 38, 40 and 42 of any suitable rigid material, such as, wood or metal, each have one of their ends 44, 46, 48, 50, respectively, pivotally mounted in substantially equally spaced relation about the periphery of arm mounting plate 20 by means of bolts 52. Although bars 36, 38, 40 and 42 are shown as being rectangular in transverse cross section, it is to be understood that such bars could, within the scope of the present invention, be of any desired shape in transverse cross section.

Riders 54, 56, 58 and 60, each of which is provided with a longitudinal slot or groove 62, rectangular in cross section, are, respectively, arranged to be freely slidably mounted on bars 36, 38, 40 and 42 by means of slot or groove 62. The slot or groove 62 in each of the riders 54, 56, 58 and 60 is closed in order to retain the associated bar therein, by means of a plate 63, removably secured to the bar by means of screws 65.

Corner clamp means 64, 66, 68 and 70 are, respectively, supported on the riders 54, 56, 58 and 60 by means of pins 72. Since each of the corner clamp means and the manner of mounting such corner clamp means on its associated rider is identical, a description of the corner clamp means 64 associated with rider 54 and the structural arrangement for mounting rider 54 on corner clamp means 64 will be sufficient for the description of all the other corner clamp means and the structural arrangement for mounting such corner clamp means on their associated riders.

Figure 3:
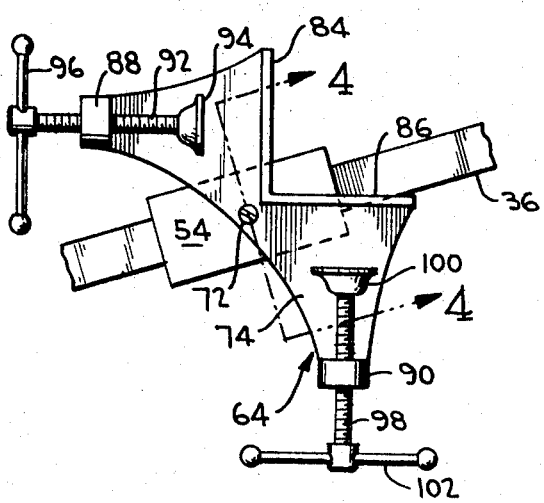
FIG. 3 is an end elevation of a runner, mounted on a bar of the frame assembly unit, having a corner clamping device supported thereon.
Figure 4:
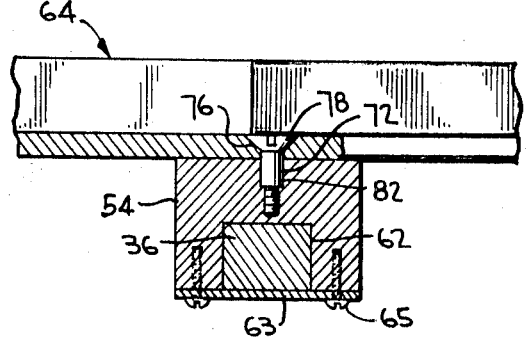
FIG. 4 is a sectional view taken along the line 4—4 of FIG. 3.

In FIG. 3, the corner clamp means 64 is shown as including a substantially flat body portion 74. Extending through flat body portions 74 is an opening 76, which may be of any shape, but which, preferably, terminates in a surface having the shape of a cone, so that it may readily coact with a conical head 78 on pin 72. The pin 72 also includes a cylindrical portion 80 that enters into a cylindrical opening 82. The cylindrical opening 82 limits the extent to which pin 72 may be threaded into rider 54 and thereby prevents binding of the conical head 78 of pin 72 against the conical surface of opening 76. Freedom of rotation of corner clamp 64 about pin 72 is accordingly assured.

Body portion 74 of corner clamp 64 has extending therefrom at right angles to each other and to said body portion, a pair of flat flange members 84, 86. Body portion 74 also has mounted thereon spaced from the flange member 84, a boss 88 provided with a threaded opening therein (not shown). Similarly, a boss 90 having a threaded opening therein (not shown) is mounted on body portion 74 and spaced from flange member 86.

A screw 92 provided with a foot 94 and operated by an operating handle 96, extends through the threaded opening in boss 88. A similar screw 98, provided with a foot 100, and operated by handle 102 extends through the threaded opening and boss 90.

In the operation of the embodiment of the invention illustrated in FIGS. 1 to 4, the workbench which is rotatably mounted on support 10, is turned so that one pair of the bars 36, 38, 40 and 42 extends to the right of the user of the picture frame assembly unit and the other pair of bars extends to the left. A section of molding $M_1$ having 45° bevels at its ends, and of a length necessary to produce one side of a frame of a desired length, is then placed on, for example, corner clamps 64 and 66 so that its ends rest on flange 84. The riders 54 and 56 are then adjusted so that a plane passing through the bevel at one of the ends of the molding section passes through the line of intersection of flange members 84 and 86 of corner clamp 64 and the plane passing through the bevel at the other end of the molding section passes through the line of intersection of the flange members 84 and 86 of corner clamp 66. The handles 102, associated with corner clamps 64 and 66, are then rotated until the section of molding $M_1$ is securely held by the corner clamps 64 and 66.

A section of molding $M_2$, of proper length, is then supported on the corner clamps 68 and 70 and held thereby, in the same manner that the section of molding $M_1$ is supported and held by corner clamps 64 and 66.

A bevelled section of molding $M_3$ of a length to exactly fit between the bevelled ends of molding sections $M_1$ and $M_2$ is then held in position by corner clamps 64 and 68 to form a nest mitered joint with molding sections $M_1$ and $M_2$. Similarly, a bevelled section of molding $M_4$ of a length to exactly fit between the molding sections $M_1$ and $M_2$ is then held in position by corner clamps 66, 70 to form a neat mitered joint with molding sections $M_1$ and $M_2$. Thereafter, the joints formed by the bevelled ends of the respective molding sections may be permanently secured together by gluing and/or nailing or in any other conventional manner.

Referring now to the modified form of four-corner picture frame assembly unit illustrated in FIGS. 5 to 7, it will be noted that a flat table 104 is provided. This table 104 may be made of any desired material and of any desired shape but in the illustrated embodiment it is illustrated as substantially square. Secured at least at each corner of the upper surface 106 of table 104 is a conventional caster 108 (only one being shown in the drawings). Casters 108 are secured in such a manner to the upper surface 106 of the table 104 that the rollers 110 are directed upwardly. Attached at the center of the upper surface 106 of table 104 by means of screws 112 is a truncated cone 114, preferably of wood, having a flat upper surface 116. An axially arranged opening 118 is provided in truncated cone 114 and frictionally secured within opening 118 is a sleeve member 120. Sleeve member 120 forms an axially disposed bearing surface for a rotatable stub shaft 122 that depends from a hub member 124. Hub member 124 is substantially square in horizontal cross section and is secured by four conventional fastening means, such as machine screws or bolts 126, to an arm mounting plate or workbench 128. Workbench 128 is provided with a centrally located opening 130 that enables it to be mounted for rotation about sleeve member 120. The height of the flat upper surface 116 of the truncated cone 114 above the upper surface 132 of the table 104 is such that it just equals the distance that a plane which is tangent to all of the rollers 110 and passes through the lower surface 134 of the workbench is from the upper table surface 132. It follows, therefore, that the lower surface 134 of the workbench 128 rests at its central portion on the flat upper surface 116 of the truncated cone 114 and at its peripheral portion on the rollers 110. Thus, the workbench 128 is adequately supported at its central and peripheral portions and binding thereof during rotation is effectively precluded.

The hub member 124 is provided with four cutout portions 136 (two of which can be seen in FIG. 6), one located at each of its corners. The machine screws or bolts 126 that secure hub member 124 to workbench 128, respectively, pivotally support arms or rods 138, 140, 142, 144. Riders or runners 146, 148, 150, of any suitable material, such as wood or metal, are each provided with a horizontal opening, such as 151, extending therethrough, which enables each of them to be freely slidable on its associated arm or rod 138, 140, 142. A similar rider or runner is freely mounted on arm or rod 144 but it cannot be seen in the drawings due to the fact that a portion of the workbench 128 has been illustrated as cut away in FIG. 5. Loosely secured to each of the riders or runners 146, 148, 150 by means of a screw or similar fastening means 158, 160, 162 so that they may rotate relative thereto are corner clamping means 164, 166, 168. A similar corner clamping means (not illustrated) is provided on the runner (not illustrated) associated with arm or rod 144.

The corner clamping means may be of any conventional design but, as illustrated in the drawings, each clamping means comprises a pair of clamping devices 170, 172 which extend at right angles to each other. A pair of such clamping devices 170, 172 is mounted on each of the plate members 174, 176, 178 associated with the runners 146, 148, 150 and on a plate member (not illustrated) associated with the runner (not illustrated) on the arm or rod 144.

The clamping devices 170, 172 are of conventional construction but, in order to show how such devices are employed in the assembly of picture frames, a description thereof is now provided.

Each of the clamping devices 170, 172 comprises a fixed member 180 that has a surface 182 that extends outwardly relative to the longitudinal axis of the clamping device and an adjustable member 184 that also has a surface 186 that extends outwardly relative to the longitudinal axis of the clamping device and parallel to fixed surface 182. The adjustable member 184 is connected by a member 190 that has threads formed thereon that cooperate with threads formed in and extending longitudinally of the axis of the clamping device. Threaded member 190 is provided with a handle 192 which makes it possible to actuate the adjustable member 184 and move the surface 186 either toward or away from fixed surface 182.

The operation of the embodiment of the invention illustrated in FIGS. 5 to 7 is quite similar to that described in connection with the form of invention illustrated in FIGS. 1 to 4.

The workbench 128 with its hub member 124, which is freely rotatable with respect to the top 132 of table 104 by reason of the engagement of its undersurface 134 with the flat upper surface of truncated cone 116 and rollers 110 is exceptionally stable and entirely free from binding when it is rotated with respect to the position of the user thereof. In use it is turned until a pair of corner clamping means, such as 164, 166, are within the reach of the person who desires to assemble a frame. A length or section of molding $M_5$, which has been cut to a size equal to one of the desired dimensions of a finished frame and mitered at a 45° angle at its ends is placed between adjacent clamping means such as 164 and 166. When so placed, the surface 182 of the fixed clamping member 180 of both clamping means 164 and 166 is spaced from the face of adjustable frame member 184 a greater distance than the width of the length of molding $M_5$. The handles 192 which form parts of each of the clamping means 164, 166 are then turned until the length of molding $M_5$ is loosely held in place on the workbench 128. The workbench 128 is then turned through an angle of 90° to bring the corner clamping means 164 and 168 in front of the person assembling the frame. The same operation is then carried out on the length of molding $M_6$. However, at this time the lengths of molding are adjusted relative to each other until the adjacent mitered ends of molding lengths $M_5$ and $M_6$ abut each other. The handles 192 of clamping device 170, forming a part of clamping means 166, of clamping devices 170 and 172 of clamping means 164 and of clamping device 172, forming a part of clamping means 168 are then actuated to cause the adjustable faces of the clamping means to temporarily tightly hold the mitered ends of the molding lengths together.

The end of molding length $M_7$ is then placed in temporary secured abutting relationship with molding length $M_6$ in the same manner that the end of molding length $M_6$ is placed in abutting relationship with molding length $M_5$. The ends of molding length $M_8$ are placed and temporarily secured in abutting relationship with the ends of molding lengths $M_5$ and $M_7$, in a similar manner.

When the abutting ends of all the molding lengths are tightly held in engagement, it is apparent that the molding lengths can be permanently secured together by any well known fastening expedient such as nails. Should it be desired to secure the ends of the molding lengths together by an adhesive material, such adhesive material would be applied to the molding lengths prior to securing such lengths in tight abutting relationship by actuation of the handles 192. In fact, both nails and an adhesive material may be employed, if desired, to secure the frame sections together.

After reading the foregoing detailed description, it will be apparent that the objects set forth initially have been successfully achieved.

What I claim is:

1. A picture frame assembly unit comprising an arm mounting means, a plurality of elongated arm means, each arm means having one end pivotally mounted on said arm mounting means, said arm means being disposed in spaced relation with respect to each other about the periphery of said arm mounting means, a runner freely slidably mounted on each of said arm means, and a corner clamping means pivotally mounted on each of said runners for holding the ends of sections of picture frame molding members in abutting relation whereby said molding ends may be permanently secured together by conventional fastening means; each said clamping means including means for engaging the opposite sides of each of two adjacent frame members.

2. A picture frame assembly unit as defined in claim 1, wherein said arm mounting means is affixed to a rotatably supported workbench means.

3. A picture frame assembly unit as defined in claim 1, wherein said arm means comprises four bars.

4. A picture frame assembly unit as defined in claim 1, wherein said corner clamp means comprises a pair of flange members extending at right angles to each other and a screw associated foot means positioned to cooperate with each of said flange members.

5. A picture frame assembly unit as defined in claim 1, wherein said corner clamp means comprises a substantially flat body member, a pair of flange members extending at right angles to said body member and at right angles to each other, and a threaded boss extending from said body member adjacent each of said flange members of said pair of flange members and supporting a screw actuated foot means positioned to cooperate with its associated flange member.

6. A picture frame assembly unit as in claim 1, wherein said arms are rectangular in transverse cross section and each of said runners is provided with a longitudinally extending rectangular slot for slidably mounting said runners on said arms.

7. A picture frame assembly unit as in claim 6, wherein the slot in said runners is closed by a removable plate.

8. A picture frame assembly unit as in claim 1, wherein the pivotal mounting for said corner clamp means includes a pin having a threaded portion secured to said runner and an unthreaded portion extending through an opening formed in said corner clamp means.

9. A picture frame assembly unit as in claim 1, wherein the support for the rotatable workbench means comprises a table member, an internally threaded sleeve portion, having a head thereon, extending through said arm mounting means, said rotatable workbench and said table member, and a bolt having a head thereon in engagement with said table member and threaded into said sleeve portion.

10. A picture frame assembly unit as in claim 11, wherein said plurality of elongated arm means consists of four arms, rectangular in transverse cross section; said arm mounting means is affixed to a rotatable workbench; said corner clamp means each comprise a substantially flat body member, a pair of flange members extending at right angles to said body member and at right angles to each other, and a threaded boss extending from said body member adjacent each of said flange members of said pair of flange members and supporting a screw actuated foot means positioned to cooperate with its associated flange member; said runners are each provided with a longitudinally extending rectangular slot for slidably mounting said runners on said arms, the slot being closed by a removable plate; the pivotal mounting of said corner clamp means includes a pin having a threaded portion secured to said runner and an unthreaded portion extending through an opening formed in said corner clamp; and said support for said rotatable workbench comprises a table, an internally threaded sleeve portion having a head thereon extending through said arm mounting plate, said rotatable workbench, and said table, and a bolt having a head thereon and engaged with said table and threaded into said sleeve portion.

11. A picture frame assembly unit comprising an arm mounting workbench means, a plurality of elongated arm means, each arm means having one end pivotally mounted on said arm mounting workbench means, said arm means being disposed in spaced relation with respect to each other about the periphery of said arm mounting workbench means, a runner freely slidably mounted on each of said arm means, and a corner clamping means pivotally mounted on each of said runners for holding the ends of sections of picture frame molding members in abutting relation whereby said molding ends may be permanently secured together by conventional fastening means; each said clamping means including means for engaging two adjacent frame member ends in a manner to temporarily prevent relative angular movement of said adjacent ends.

12. A picture frame assembly unit as defined in claim 11 wherein means are provided for mounting said workbench for rotation.

13. A picture frame unit as defined in claim 12 wherein said means provided for the rotation of said workbench includes a table; a sleeve member secured with respect to and extending at right angles to said table; and a stub shaft secured with respect to said workbench and rotatable within said sleeve member.

14. A picture frame unit as defined in claim 13 wherein said stub shaft extends from a hub member that is secured to said workbench and forms a support for pivotally mounting said elongated arm means.

15. A picture frame assembly unit as defined in claim 13 wherein said sleeve member is secured within an opening formed centrally of a truncated cone that is secured to the upper surface of said table.

16. A picture frame assembly unit as defined in claim 15 wherein the central portion of the undersurface of the workbench is flat and is in rotatable contact with the upper surface of the truncated cone whereby any tendency for tilting of the central portion of the workbench is reduced.

17. A picture frame assembly unit as defined in claim 13 wherein the table is of substantially rectangular shape and is provided with casters in proximity to at least some of the table corners with the rollers of the casters lying in a common plane spaced from the upper surface of said table and in contact with the lower surface of said workbench thereby forming support means for the peripheral portion of the workbench.

18. A picture frame assembly unit as defined in claim 17 wherein the central portion of the undersurface of the workbench is flat and in rotatable contact with the upper surface of the truncated cone whereby any tendency for the workbench to tilt at its central portion or at its peripheral portion is materially reduced.

19. A picture frame assembly unit as defined in claim 18 wherein the height of the upper surface of the truncated cone above the upper surface of the table is such that it just equals the distance that a plane which is tangent to all the rollers and passes through the lower surface of the workbench is from the upper surface of the table.

20. A picture frame assembly unit as defined in claim 19 wherein each of said clamping means includes means for engaging the opposite sides of each of two adjacent frame members.